United States Patent
Knoble et al.

(10) Patent No.: US 8,801,318 B2
(45) Date of Patent: Aug. 12, 2014

(54) JOINT

(75) Inventors: Jesse Knoble, Oshkosh, WI (US); Eric Braun, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 1910 days.

(21) Appl. No.: 11/661,725

(22) PCT Filed: Sep. 3, 2004

(86) PCT No.: PCT/US2004/028759
§ 371 (c)(1),
(2), (4) Date: Mar. 24, 2008

(87) PCT Pub. No.: WO2006/028452
PCT Pub. Date: Mar. 16, 2006

(65) Prior Publication Data
US 2009/0016808 A1    Jan. 15, 2009

(51) Int. Cl.
*F16C 11/06* (2006.01)

(52) U.S. Cl.
USPC .............. 403/51; 403/131; 384/145; 384/203

(58) Field of Classification Search
CPC .. F16C 11/06; F16C 11/0609; F16C 11/0614; F16C 11/0666
USPC ........... 384/145–153, 192, 203, 206; 403/50, 403/51, 131–135
See application file for complete search history.

(56) References Cited

U.S. PATENT DOCUMENTS

| | | | | |
|---|---|---|---|---|
| 4,447,094 A * | 5/1984 | Trudeau et al. | ............... | 384/145 |
| 4,483,569 A * | 11/1984 | Smith | ............... | 384/2 |
| 4,858,962 A * | 8/1989 | Bolling et al. | ............. | 285/121.7 |
| 5,069,571 A * | 12/1991 | Matczak et al. | ............. | 403/134 |
| 5,209,596 A * | 5/1993 | Matczak et al. | ............. | 403/134 |
| 5,211,261 A * | 5/1993 | Garberg | ............. | 184/5.1 |
| 5,284,398 A * | 2/1994 | Sakai | ............. | 403/135 |
| 5,342,128 A * | 8/1994 | Gruber | ............. | 384/203 |
| 5,364,191 A * | 11/1994 | Gruber | ............. | 384/203 |
| 5,931,597 A * | 8/1999 | Urbach | ............. | 403/134 |
| 6,325,544 B1 * | 12/2001 | Sasaki et al. | ............. | 384/192 |
| 6,349,470 B1 * | 2/2002 | Sasaki et al. | ............. | 29/898.062 |

OTHER PUBLICATIONS

International Search Report for PCT/US04/28759, date of mailing Jul. 18, 2006, 1page.

* cited by examiner

*Primary Examiner* — Victor MacArthur
(74) *Attorney, Agent, or Firm* — Foley & Lardner LLP

(57) ABSTRACT

A joint for use in a suspension system including an elongated suspension member is disclosed. The bearing assembly comprises an outer race, an inner race, a shaft, a collar, and a seal. The outer race is configured to be coupled to the elongated suspension member. The inner race is coupled to the outer race and is moveable relative to the outer race. The shaft is coupled to the inner race. The collar is coupled to the shaft and limits the movement of at least one of the inner race and the shaft relative to the outer race. The seal member is configured to form a seal between one of the shaft and the first collar and one of the outer race and a portion of the elongated suspension member.

15 Claims, 6 Drawing Sheets

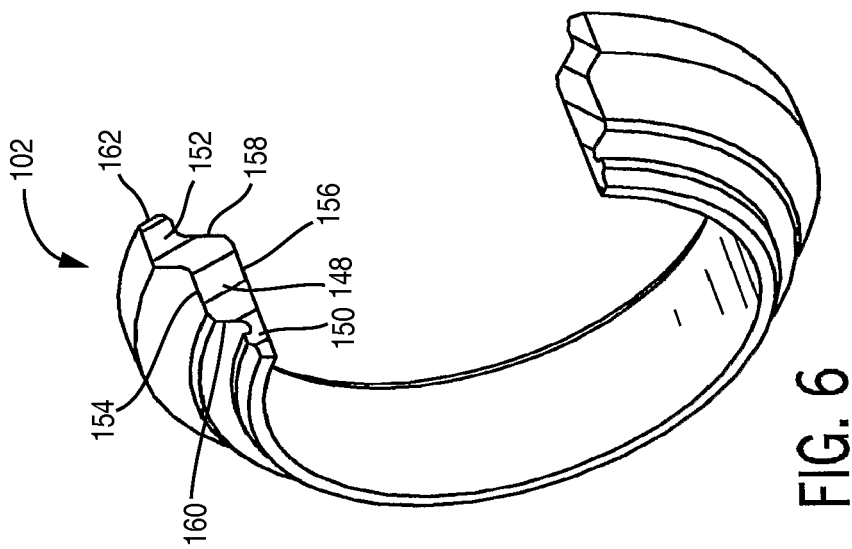
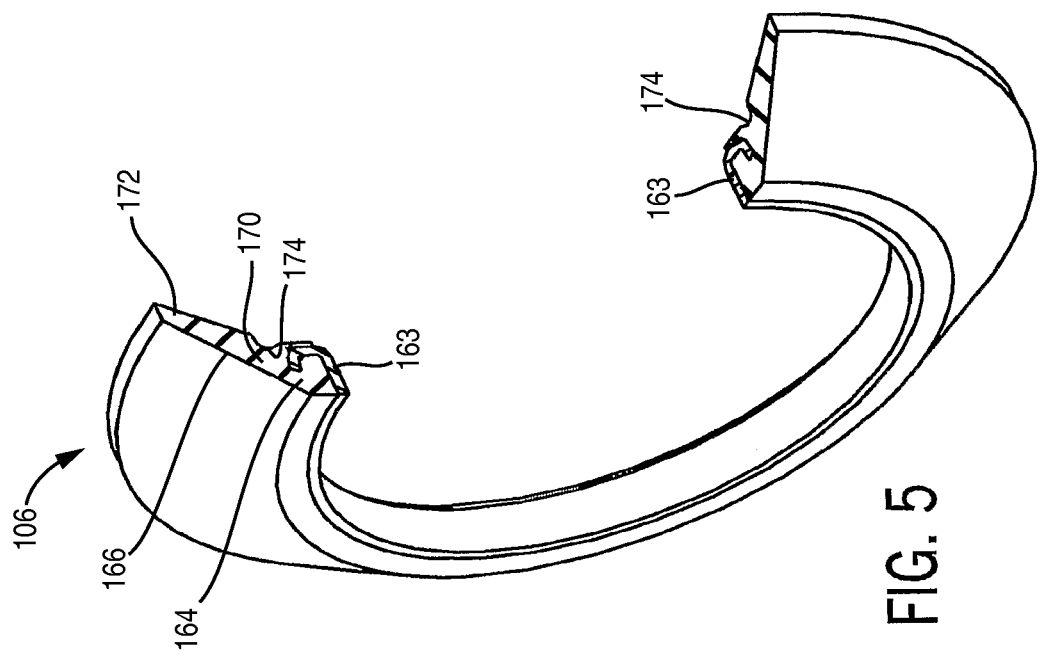

JOINT

BACKGROUND OF THE INVENTION

The present invention relates generally to the field of suspension systems. More particularly, the present invention relates to the field of joints or bearings for use in suspension systems.

Spherical-type bearings or joints are commonly used in suspension systems to couple a shock or strut to a control arm in a manner that allows the shock or strut to pivot or rotate around one or more axes relative to the control arm. In order to function properly over a sufficient period of time, spherical bearings are generally lubricated and efforts are made to minimize the amount of debris that enters the bearing, particularly the surfaces that rub against one another as the bearing operates. In order to maintain the lubricated state of the bearing and minimize the amount of debris that enters the bearing, various attempts have been made to seal the bearing.

Some attempts to seal the bearing have involved seating a relatively small lip seal in the outer race of the bearing so that the seal rides on the ball or inner race as the bearing operates. However, in order to seat within the outer race, the lip seal must be relatively small, which tends to reduce the effectiveness of the seal. Moreover, such a seal has a tendency to fall off the edge of the ball or inner race and get crushed by the pin of the bearing when it moves into a maximum rotational position.

Other attempts have been made to seal the bearing by providing a type of flexible covering or boot over the entire bearing. Although such a covering may reduce the amount of debris that enters the bearing, it generally does not provide an effective means of retaining the lubrication within the internal structures of the bearing. Moreover, such a covering may not be appropriate for certain applications and may make visual inspections, repair, and routine maintenance of the bearing more difficult. In addition, in order to properly seal the bearing, such coverings or boots are often assembled tightly around one or more parts of the bearing and/or the components coupled to the bearing. If the different components to which the boot is coupled move relative to one another, particularly if they rotate relative to one another, the tight fit of the boot against each component causes different portions of the boot to move relative to one another, which may cause the boot to twist or wrap up and become damaged.

BRIEF DESCRIPTION OF THE DRAWINGS

FIG. 5 is a perspective view of a seal of the joint of FIG. 3 showing a portion of the seal cut away.

FIG. 6 is a perspective view of a limiter ring of the joint of FIG. 3 showing a portion of the limiter ring cut away.

DETAILED DESCRIPTION OF THE EXEMPLARY EMBODIMENTS

Before providing the description of the exemplary and alternative embodiments of the joint or bearing, it should be noted that references to "upper" and "lower" or "left" and "right" or "inner" and "outer" in this description are merely used to identify the various elements as they are oriented in the Figures. These terms are not meant to limit the element which they describe, as the various elements may be oriented differently in various suspension systems.

For purposes of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 1:
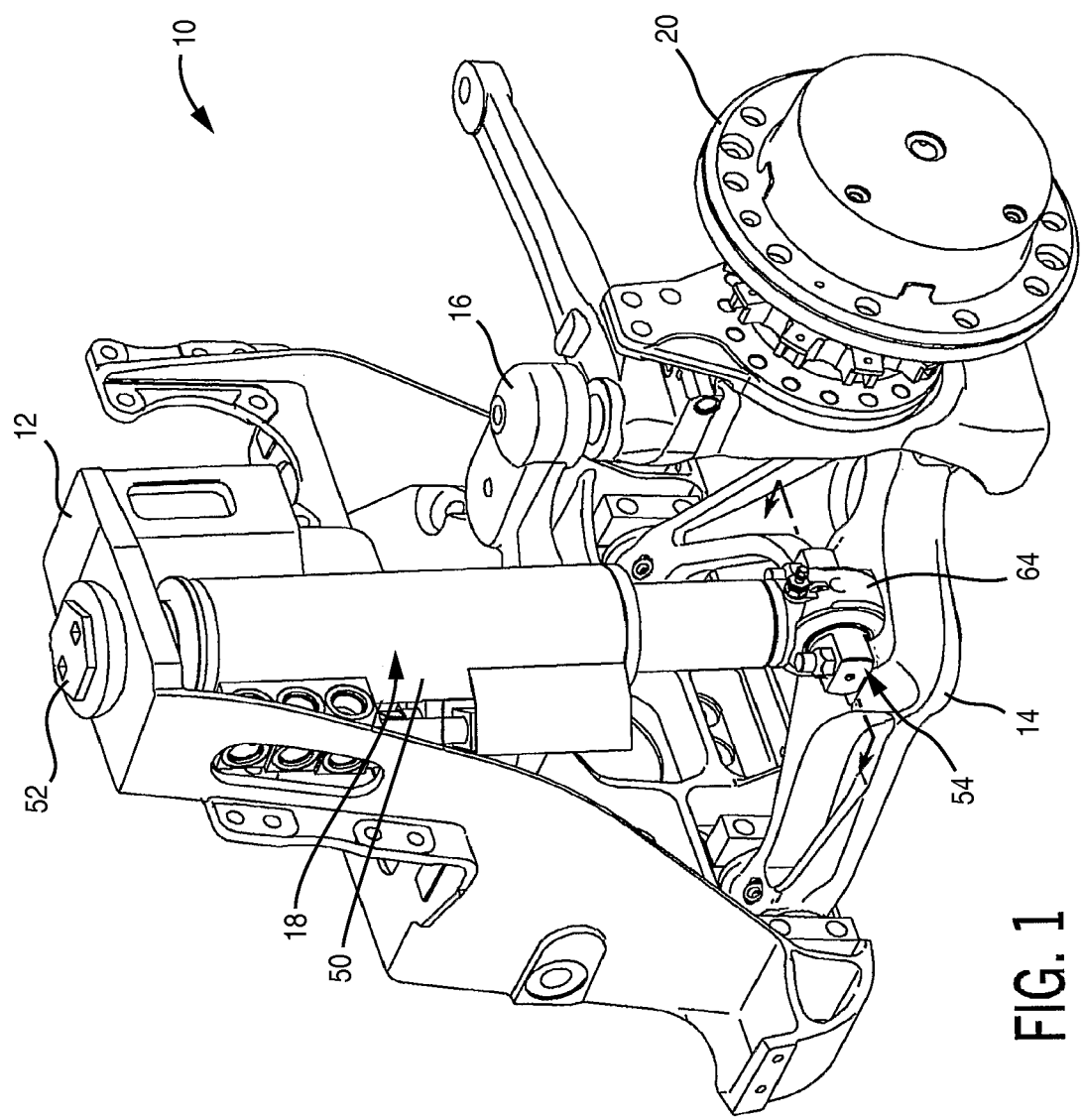
FIG. 1 is a perspective view of a suspension system according to one exemplary embodiment.

Referring to now FIG. 1, a suspension system 10 according to one exemplary embodiment includes a frame member 12, a lower control arm 14, an upper control arm 16, a cylinder assembly 18, and a wheel and brake assembly 20. Frame member 12 is the portion of the frame to which lower control arm 14, upper control arm 16, and cylinder assembly 18 are coupled. According to various exemplary and alternative embodiments, the frame member may take one of a variety of different shapes and/or sizes depending upon the characteristics of the vehicle to which suspension system 10 will be coupled and the configuration of suspension system 10. According to other various alternative embodiments, the frame member may be integrally formed as a single unitary body with another portion of the frame, or may be a separate structure or apparatus coupled to the frame.

Lower control arm 14 and upper control arm 16 are each coupled to a portion of frame member 12, with upper control arm 16 being located generally above and parallel to lower control arm 14. Lower control arm 14 and upper control arm 16 each have a first end that is pivotally coupled to a portion of frame member 12 and a distal end that is coupled to opposite sides of wheel and brake assembly 20. Lower control arm 14 and upper control arm 16 are coupled to frame member 12 and wheel assembly 20 in such a way that allows wheel assembly 20 to translate up and down in response to varying road conditions. Generally, lower control arm 14 and upper control arm 16 control, limit, or restrict, to a certain extent, the movement of wheel and brake assembly 20 relative to frame member 12.

Wheel and brake assembly 20 is coupled to lower and upper control arms 14 and 16 and generally includes certain components of the brake system of the vehicle as well as the structure to which the wheel and tire are mounted. Wheel and brake assembly 20 generally transfers the movement of the tires of the vehicle to the other portions of suspension system 10. According to various exemplary and alternative embodiments, the wheel and brake assembly may include one or more of a variety of different components and may take one of a variety of different configurations.

A suspension member shown as cylinder assembly 18 extends between lower control arm 14 and frame member 12 and generally controls, limits, and/or dampens the movement of lower control arm 14 relative to frame member 12. Cylinder assembly 18 includes a cylinder 50, a mounting apparatus 52, and a joint 54.

Figure 2:
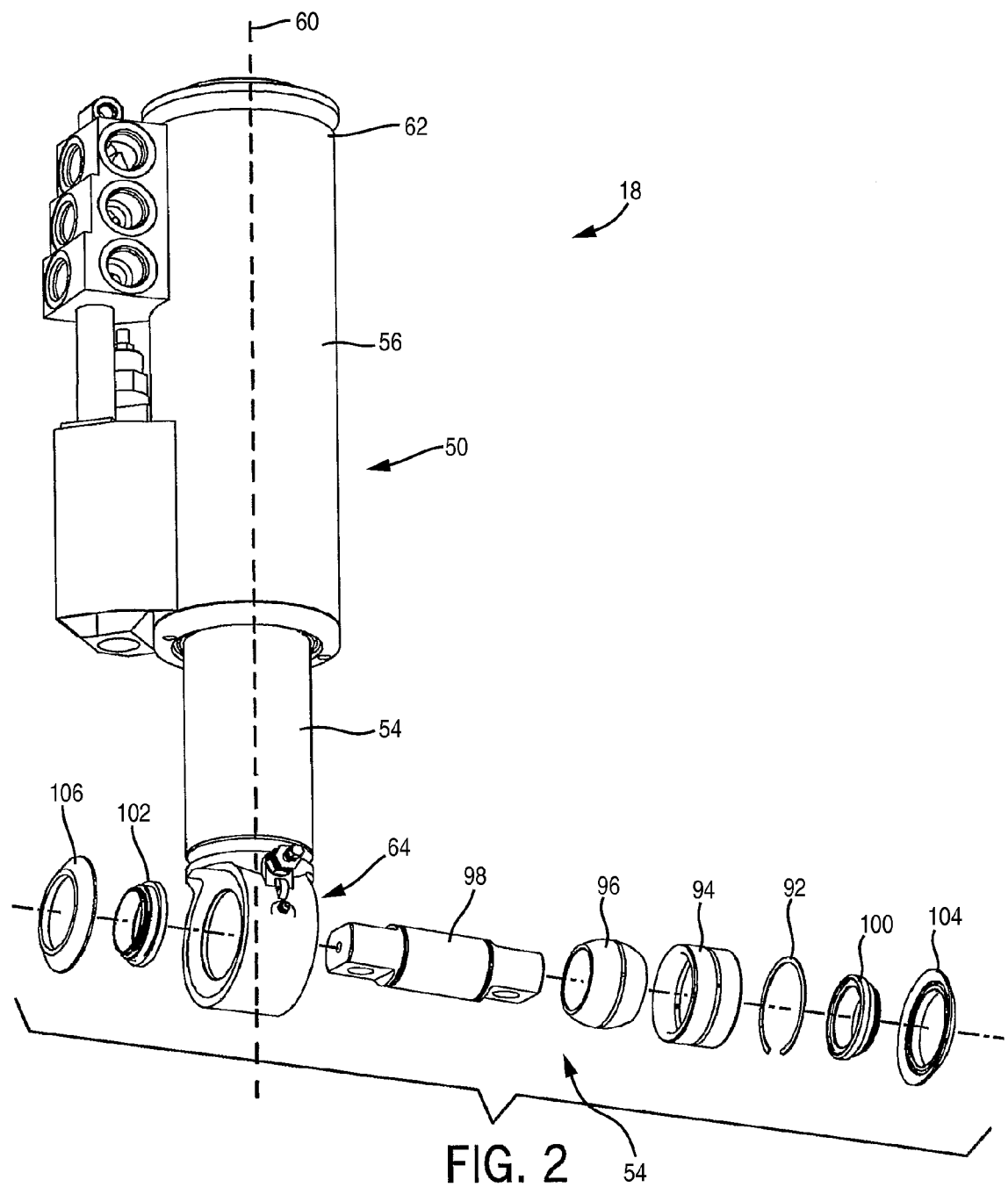
FIG. 2 is an exploded perspective view of a portion of the cylinder assembly of the suspension system of FIG. 1.

Referring now to FIGS. 1 and 2, cylinder 50 may be any one of a variety of different cylinders, including those that are presently commercially available. For example, the cylinder may be a conventional shock absorber or strut or other type of hydraulic and/or pneumatic cylinder. According to one exemplary embodiment, cylinder 50 is a hydraulic cylinder that has the characteristics of both a spring (similar to those used in conventional suspension systems) and a shock. One example of such a cylinder is a hydro-pneumatic spring that is modified to include a damping valve. Cylinder 50 includes a tube 56 and a piston rod 58 that share a longitudinal axis 60. The length of cylinder 50 changes as piston rod 58 moves into and out of tube 56 in response to the application of a force, such as a force exerted by hydraulic fluid within the cylinder 50 or a force exerted by an element coupled to cylinder 50. Cylinder 50 includes a tube end 62 that is coupled to frame member 12 (through mounting apparatus 52) and a rod end 64 that is coupled to lower control arm 14 (through joint 54). Tube end 62 is generally configured to be coupled to mounting apparatus 52, while rod end 64 is configured to be coupled to joint 54.

According to various exemplary and alternative embodiments, the tube end of the cylinder may take anyone of a variety of different shapes and configurations. The shape and configuration of the tube end may depend on a variety of factors, including the characteristics of the environment in which the cylinder will be used and the characteristics of the mounting apparatus to which the cylinder will be coupled, among other possible factors. According to one exemplary embodiment, tube end 62 of cylinder 50 may take one of the configurations described in U.S. patent application Ser. No. 10/933,809, now U.S. Pat. No. 7,108,253, entitled "Mounting Assembly" filed on Sep. 3, 2004 and listing Jesse Knoble and Roy Venton-Walters as inventors, which is hereby incorporated by reference in its entirety.

Referring now to FIGS. 1-4, rod end 64 of cylinder 50 is a rigid member that is generally designed to receive joint 54. Rod end 64 includes a cylindrical portion 66 having an aperture 68 extending therethrough. Cylindrical portion 66 includes an end 70 (shown as the right end in FIG. 3) and an end 72 (shown as the left end in FIG. 3). End 70 includes a counterbore or recess 74 that is concentric with aperture 68, that extends into end 70, and that has a diameter that is larger than the diameter of aperture 68. Counterbore 74 forms a wall 76 that is generally perpendicular to end 70 and a surface 78 that is generally parallel to end 70. Similarly, end 72 includes a counterbore or recess 80 that is concentric with aperture 68, that extends into end 72, and that has a diameter that is larger than the diameter of aperture 68. Counterbore 80 forms a wall 82 that is generally perpendicular to end 72 and a surface 84 that is generally parallel to end 72.

Cylinder portion 66 also includes a flange or projection 86 that is disposed proximate counterbore 80 (and which may form a portion of surface 84 of counterbore 80) and that extends inwardly from the wall of aperture 68 to form a ledge or shoulder 88. Ledge 88 acts as a stop against which a portion of joint 54 rests or abuts when joint 54 is coupled to rod end 64. The wall of aperture 68 also includes a groove 90 that is located generally near the end of aperture 68 that is opposite ledge 88 (e.g., the end of aperture 68 that is closest to end 70) and that is configured to receive a snap ring 92. Ledge 88 of flange 86, groove 90, and snap ring 92 cooperate to retain joint 54 within cylindrical portion 66 of rod end 64. The distance D between ledge 88 and groove 90 is slightly larger than the width of the portion of joint 54 that will be retained between ledge 88 and snap ring 92.

According to various alternative embodiments, the rod end of the cylinder may take one of a variety of different shapes, sizes, and configurations in order to receive or couple to the joint. Moreover, the tube end of the cylinder may be configured to receive the joint rather than the rod end of the cylinder. According to other various alternative embodiments, the locations of the ledge and the groove may be reversed, or the ledge and the groove may be located at different positions within the cylindrical portion in order to accommodate one of a variety of different joints. According to another alternative embodiment, the ends of the cylindrical portion may not include counterbores. According to still other various alternative embodiments, the rod end of the cylinder may be integrally formed as a single unitary body with the other portions of the piston rod, or it may be separately formed and coupled to the piston rod.

Mounting apparatus or assembly 52 is a structure or assembly of elements that couple tube end 62 of cylinder 50 to frame member 12. According to one exemplary embodiment, mounting apparatus 52 is configured to allow cylinder 50 to pivot or articulate relative to frame member 12 as suspension system 10 operates. This may be accomplished in one of a variety of different ways using one or more of a variety of different structures and assemblies. According to one exemplary embodiment, the pivoting or articulation of cylinder 50 is facilitated by a mounting apparatus having an elastomeric member, such as a bushing, isolator, or pad, on each side of frame member 12 between cylinder 50 (or an extension of cylinder 50) and frame member 12 such that the elastomeric members deflect or deform when the orientation of cylinder 50 changes during the operation of suspension system 10. The elastomeric members are generally disposed such that one of the elastomeric members is compressed when cylinder 50 is forced toward frame member 12 (e.g., such as may occur during the jounce or compression of suspension system 10) and the other elastomeric member is compressed when cylinder 50 is forced away from frame member 12 (e.g., such as may occur when the vehicle becomes airborne and suspension system 10 becomes fully extended in the rebound position). The elastomeric members also tend to reduce the magnitude of any shock or force spikes that are transmitted to frame member 12 during the operation of suspension system 10. An example of such a mounting apparatus is described in U.S. patent application Ser. No. 10/933,809, now U.S. Pat. No. 7,108,253, entitled "Mounting Assembly" filed on Sep. 3, 2004 and listing Jesse Knoble and Roy Venton-Walters as inventors, which is hereby incorporated by reference in its entirety. According to various alternative embodiments, the mounting apparatus may be one of a variety of different apparatuses or assemblies.

As best shown in FIGS. 1-4, a connector shown as joint 54 (e.g., bearing, spherical bearing, ball joint, coupler, mount, mounting joint, etc.) is coupled to rod end 64 of cylinder 50 and generally serves as an intermediate member or assembly between cylinder 50 and lower control arm 14 that allows cylinder 50 to move (e.g., pivot, rotate, or articulate) relative to lower control arm 14 as suspension system 10 operates. Joint 54 includes an outer race 94, an inner race 96, a pin 98, limiter rings 100 and 102, and seals 104 and 106.

Figure 3:
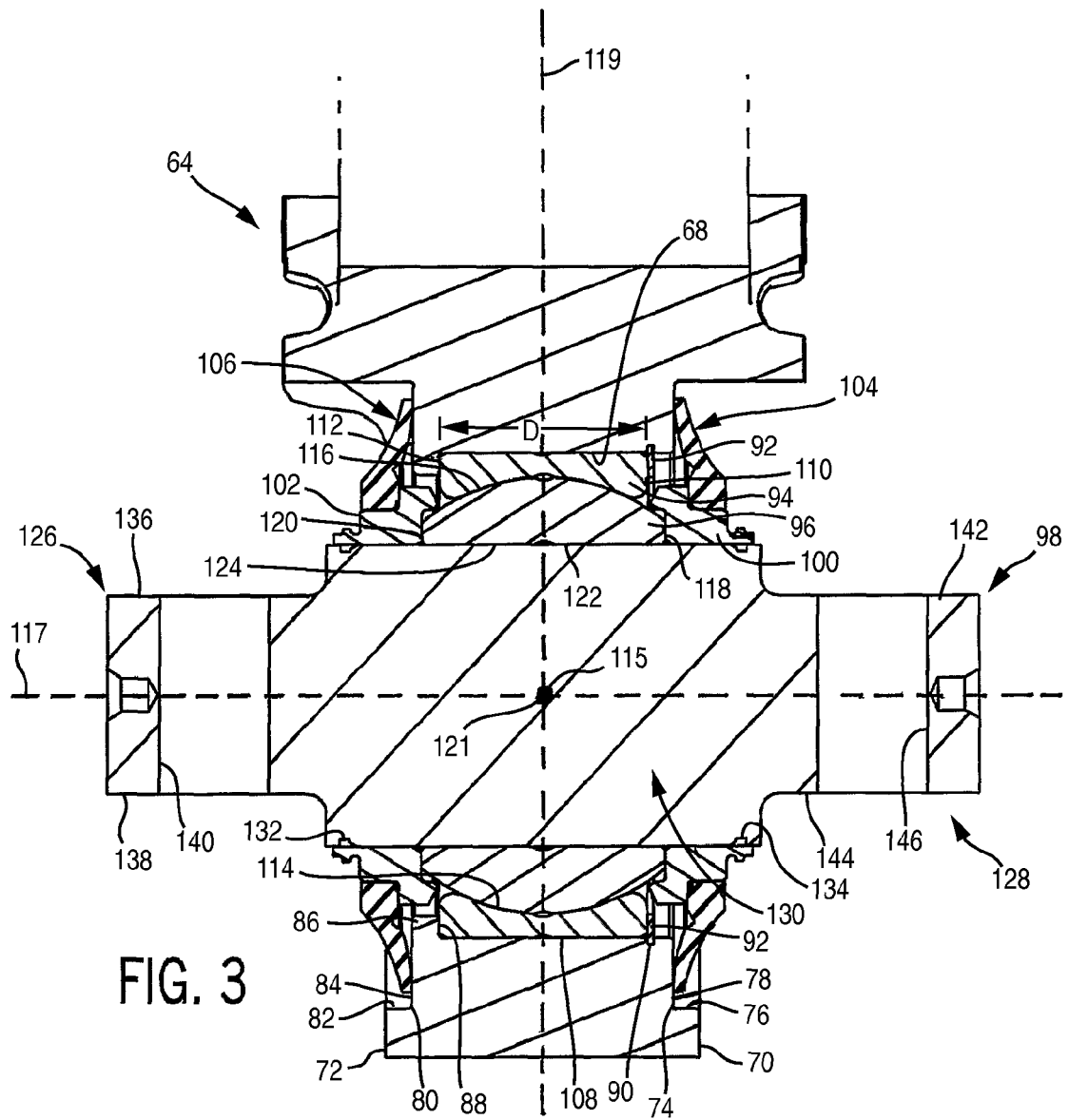
FIG. 3 is a cross-sectional view of a joint of the cylinder assembly of FIG. 1 in a first condition.
Figure 4:
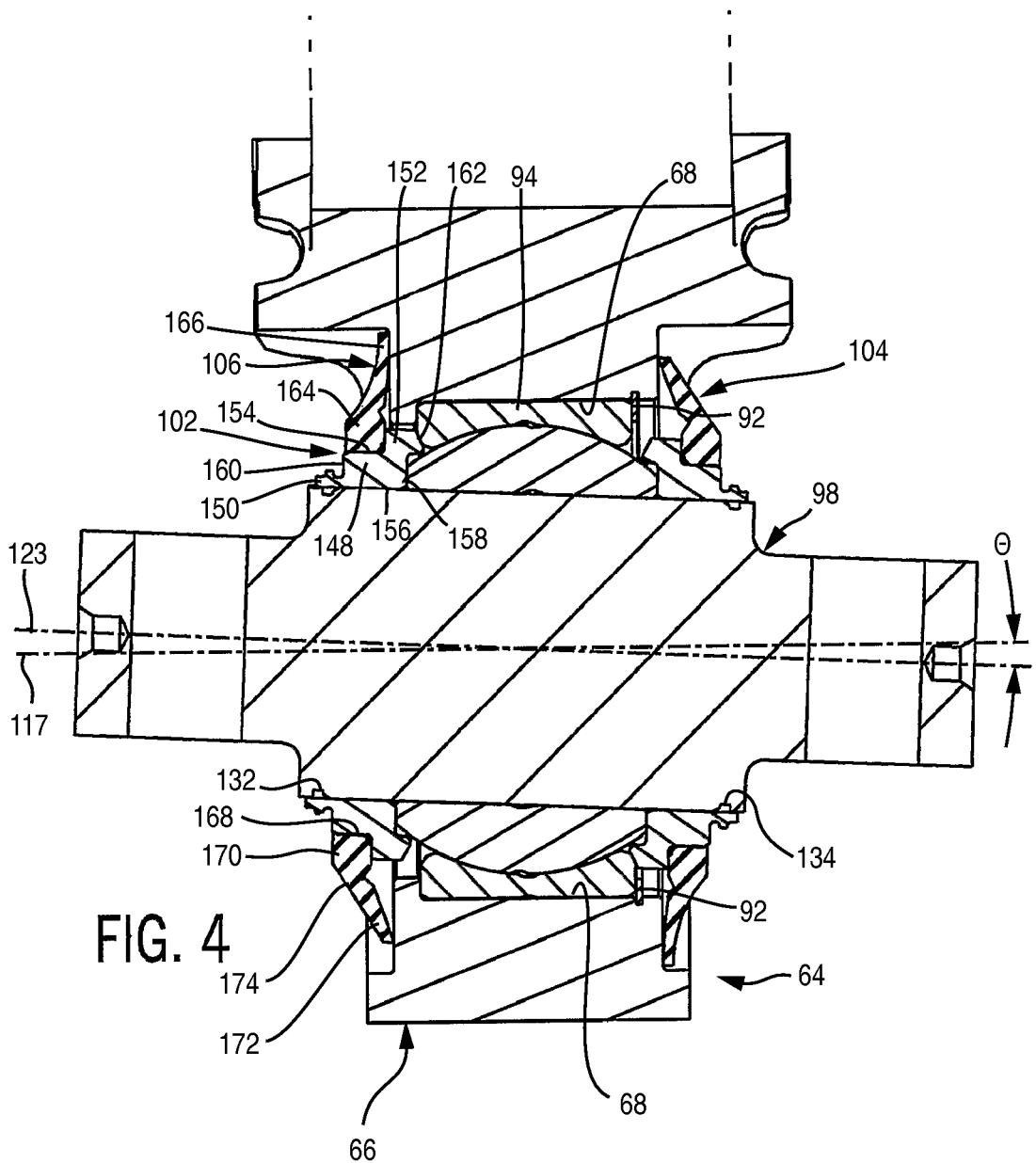
FIG. 4 is a cross-sectional view of the joint of the cylinder assembly of FIG. 1 in a second condition.

Referring now to FIGS. 2-4, outer race 94 (e.g., ball joint race, outer ring, etc.) is a rigid, generally cylindrical tube that has an outer wall 108, ends 110 and 112, and an inner wall 114. Outer wall 108 has a diameter that is slightly larger than the diameter of aperture 68 of rod end 64, which allows outer race 94 to be press fit into aperture 68. The width of outer wall 108 is generally defined by the distance between end 110 and end 112, which is slightly less than the distance D between ledge 88 and groove 90 of rod end 64. Accordingly, once outer race 94 is coupled to rod end 64 of cylinder 50, end 112 is generally adjacent to (and/or abutting) ledge 88 while end 110 and is generally adjacent to (and/or abutting) groove 90 and snap ring 92. Ledge 88 and snap ring 92 essentially form a channel that extends around the inside of cylindrical portion 66 of rod end 64, which generally restrains the movement of outer race 94 into and out of cylindrical portion 66. Inner wall 114 is a generally concave surface that corresponds to the shape of inner race 96.

Outer race 94 includes a center point 115 that lies at a point that is halfway between ends 110 and 112 and that is at the center of the circumference defined by outer wall 108. Center point 115 defines the point at which three perpendicular axes intersect. The first axis 117 is a longitudinal axis that extends through the center of the generally cylindrical tube defined by outer wall 108 and inner wall 114 (e.g., extending from left to right in FIG. 3). The second axis 119 is a radial axis (with respect to outer race 94) that extends across the diameter of outer race 94 and that forms a longitudinal axis of cylinder 50 (e.g., extending from top to bottom in FIG. 3). The third axis 121 is also a radial axis that extends across the diameter of outer race 94, only third axis 121 is perpendicular to second axis 119 (e.g., extending into and out of the page in FIG. 3).

According to various exemplary and alternative embodiments, the outer race may be one of a variety of different shapes, sizes, and configurations. For example, the outer race may be a solid race or it may be a split race. If the outer race is a split race, the outer race may have one, two, or more than two splits or fractures, and the fractures may be oriented differently (e.g., a split may be provided at one or more points on the circumference of the outer race or a split may be provided around the circumference of the outer race to divide it into two generally cylindrical portions). According to another alternative embodiment, the outer race may be integrally formed as a single unitary body with a portion of the cylinder, such as the rod end of the cylinder. According to other various alternative and exemplary embodiments, the outer race may be coupled to the cylinder in one of a variety of different ways using one or more of a variety of different methods or techniques, such as welding, adhesives, fasteners, an interference fit, a threaded interface, a press fit, etc.

Inner race 96 (e.g., ball joint, inner ring, etc.) is a rigid, generally spherical-shaped member that is rotatably coupled to outer race 94. Inner race 96 includes an outer wall 116, ends 118 and 120, and an inner wall 122. Outer wall 116 forms a convex or spherical surface that corresponds to the shape or contour of inner wall 114 of outer race 94. Inner wall 122 defines an aperture 124 that extends through the center of inner race 96. Ends 118 and 120 generally extend between the corresponding sides of outer wall 116 and inner wall 122. Inner race 96 shares center point 115 with outer race 94 and is capable of pivoting or rotating with respect to outer race 94 around center point 115. The ability of inner race 96 to rotate about center point 115 is due to the general spherical shape of outer wall 116 of inner race 96, and the corresponding convex shape of the inner wall 114 of outer race 94. However, as will be explained more fully below, the incorporation of pin 98 and limiter rings 100 and 102 into joint 54 limits the extent to which inner race 96 is capable of pivoting or rotating around center point 115.

A generally rigid bar, post, pole, peg, dowel, axle, or rod shown as a pin 98 extends through aperture 124 of inner race 96 and essentially functions as an intermediate member that allows inner race 96 to be coupled to another structure that is intended to move relative to cylinder 50. Pin 98 generally serves as an extension of inner race 96 that is capable of moving or rotating around center point 115 in the same manner that inner race 96 is capable of moving relative to outer race 94. Pin 98 includes an axis 123 that extends longitudinally through its center, through the center of inner race 96, and through center point 115. Because pin 98 generally extends beyond the full spherical periphery of inner race 96 (or what would be the full periphery of inner race 96 if it were a complete sphere), the movement of pin 98 may be generally limited due to the fact that pin 98 and/or the limiter rings 100 and 102, which are discussed below, may eventually contact outer race 94 or some other portion of joint 54 or cylinder 50 when pin 98 is rotated around center point 115 beyond a certain point. The contact that pin 98 and/or limiter rings 100 and 102 may make with outer race 94 or some other portion of joint 54 or cylinder 50 generally does not limit the extent to which pin 98 may be rotated around axis 123, but it does limit the extent to which axis 123 (and therefore pin 98) may be rotated or pivoted relative to axis 117.

According to one exemplary embodiment, pin 98 includes an end portion 126, an end portion 128, and a middle portion 130 located between the two end portions. Middle portion 130 is a generally cylindrical portion of pin 98 that is configured to fit within aperture 124 and be coupled to inner race 96. The diameter of middle portion 130 is such that inner race 96 may be press fit onto middle portion 130. Proximate end portion 126, middle portion 130 includes a groove 132 that extends generally around the circumference of middle portion 130 and that is configured to receive a portion of limiter ring 102. Middle portion 130 also includes a generally identical groove 134 proximate end portion 128 that is configured to receive a portion of limiter ring 100.

End portion 126 of pin 98 is a generally cylindrical portion of pin 98 similar to middle portion 130, except end portion 126 includes two opposing recesses that form two spaced apart, substantially flat, parallel surfaces 136 and 138. End portion 126 also includes an aperture 140 that extends radially through end portion 126 between surfaces 136 and 138. Aperture 140 is generally configured to receive a coupling member or fastener (e.g., a bolt, stud, or one of a variety of other coupling devices). Flat surfaces 136 and 138 in combination with aperture 140 are intended to facilitate the coupling of pin 98 to a generally flat surface or structure, such as a portion of lower control arm 14.

End portion 128 of pin 98 is substantially identical to end portion 126. End portion 128 is a generally cylindrical portion of pin 98 similar to middle portion 130, except end portion 128 includes two opposing recesses that form two spaced apart, substantially flat, parallel surfaces 142 and 144. End portion 128 also includes an aperture 146 that extends radially through end portion 128 between surfaces 142 and 144. Aperture 146 is generally configured to receive a coupling member or fastener (e.g., a bolt, stud, or one of a variety of other coupling devices). Flat surfaces 142 and 144 in combination with aperture 146 are intended to facilitate the coupling of pin 98 to a generally flat surface or structure, such as a portion of lower control arm 14.

According to various alternative embodiments, the pin may be integrally formed with the inner race, may be press fit into the inner race, or may be coupled to the inner race using one of a variety of other methods or techniques, such as welding, adhesives, fasteners, snap rings, threaded interface, etc. According to still other alternative embodiments, the pin may take one of a variety of different shapes, sizes, and configurations depending, at least in part, on the structure to which the pin is intended to be coupled. For example, the pin may include one or more of a variety of different groves, recesses, keys, projections, apertures, etc. that facilitate the coupling of the pin to one or more of a variety of different structures.

According to one exemplary embodiment, pin 98 is made from a pretreated 4140 steel alloy that has a hardness of approximately 30 Rockwell C. According to various alternative and exemplary embodiments, the pin may be made from one or more of a variety of different materials, including various metals, steels, alloys, polymers, ceramics, or a variety of outer suitable materials. According to other exemplary and alternative embodiments, one or more portions of the pin may be hardened.

As best shown in FIGS. 3, 4, and 6, restraining apparatuses or collars shown as limiter rings 100 and 102 (e.g., stoppers, rings, abutments, bands, washers, etc.) are generally rigid members that are configured to couple to pin 98 and to at least partially limit the extent to which pin 98 may move (e.g., pivot or rotate) relative to outer race 94 and/or cylinder 50. Limiter rings 100 and 102 generally limit such movement by contacting a portion of outer race 94 after inner race 96 and/or pin 98 have moved to a certain, maximum position. Limiter rings or collars 100 and 102 are generally identical except that they are oriented in generally opposite directions when coupled to pin 98 of joint 54. Accordingly, only limiter ring 102 will be described, it being understood that limiter ring 100 is substantially the same. According to one exemplary embodiment, limiter ring 102 includes a body portion 148, a coupling portion 150, and a contact portion 152.

As best shown in FIG. 4, body portion 148 generally serves as the primary structure of limiter ring 102 from which coupling portion 150 and contact portion 152 extend or protrude. According to one exemplary embodiment, body portion 148 includes an outer surface 154, an inner surface 156, an inner end 158, and an outer end 160. Outer surface 154 is a generally cylindrical surface that extends around the outer periphery of body portion 148 and that is configured to serve as a surface upon which seal 106 is press fit or otherwise coupled. Inner surface 156 is a generally cylindrical surface, concentric with outer surface 154, that is configured to allow limiter ring 102 to be coupled to middle portion 130 of pin 98. According to one exemplary embodiment, the diameter of inner surface 156 is such that limiter ring 102 is press fit onto pin 98. Inner end 158 extends between outer surface 154 and inner surface 156 and is generally configured to contact or rest against end 120 of inner race 96. Outer end 160 extends between outer surface 154 and inner surface 156 on the side of body portion 148 that is opposite inner race 96 and provides a surface from which coupling portion 150 extends. According to various alternative and exemplary embodiments, the body portion may take one of a variety of different shapes, sizes, and configurations depending on the particular application in which the limiter rings are used.

According to various exemplary and alternative embodiments, the outer surface of the limiter ring may have one of a variety of different surface finishes, depending on how the seal is coupled to the limiter ring. According to one exemplarily embodiment, the surface finish of outer surface 154 is such that seal 106 may be press fitted onto outer surface 154. According to an alternative embodiment, the outer surface may have a suitable surface finish that allows the seal to form a suitable seal with the outer surface and that minimizes any wear on the seal when the seal is coupled to the limited ring other than by a press fit.

Coupling portion 150 extends from body portion 148 and is generally configured to be crimped to engage groove 132 in pin 98. According to one exemplary embodiment, coupling portion 150 extends from outer end 160 of body portion 148 and generally forms an extension of inner surface 156. The thickness of coupling portion 150 is generally less than that of body portion 148 so that coupling portion 150 may be sufficiently deformed or crimped into groove 132 when acted upon by a crimping device or machine. The crimping of limiter ring 102 to pin 98 generally helps to reduce any backlash (or movement of limiter ring 102 relative to pin 98) that may occur during the operation of joint 54. According to various exemplary and alternative embodiments, the coupling portion may take one of a variety of different shapes, sizes, and configurations to facilitate the coupling of the limiter ring to the pin. According to another alternative embodiment, the limiter ring may not include the coupling portion, as a limiter ring may be coupled to the pin through the use of a method or technique that does not require the coupling portion of the limiter ring.

Contact portion 152 extends from body portion 148 and is generally configured to contact outer race 94. According to one exemplary embodiment, contact portion 152 extends upwardly from outer surface 154 and outwardly with respect to body portion 148 toward inner race 96. Extending from body portion 148 in this manner is intended to allow contact portion 152 to contact outer race 94 when pin 98 is moved to a maximum position. Contact portion 152 generally includes a contact surface 162 that contacts a portion of outer race 94 when pin 98 is moved to the maximum position. Contact surface 162 is oriented so that when contact surface 162 abuts against or contacts the corresponding contact surface of outer race 94, contact surface 162 is generally parallel to the corresponding contact surface of outer race 94. According to various alternative and exemplary embodiments, the contact surface of the limiter ring may be a flat surface, it may have a contour, it may be a point or line rather than a surface, and/or it may have one of a variety of other characteristics. According to other various alternative and exemplary embodiments, the contact portion may take one of a variety of different shapes, sizes, and configurations depending on the particular application in which the limiter rings are used.

According to various exemplary and alternative embodiments, the limiter rings may take one of a variety of different configurations and may be coupled to the pin and/or the inner race in one of a variety of different ways using one or more of a variety of different method or techniques. For example, the limiter rings may be retained on the pin through the use of snap rings that seat within grooves in the pin. Moreover, various adhesives or coupling supplements, such as those commercially available from Henkel Loctite Corporation, may be used to retain the limiter rings to the pin. According to another alternative embodiment, the joint may include only one limiter ring rather than two.

According to one exemplary embodiment, limiter ring 102 is made from steel, such as a 1050 medium carbon steel. Contact surface 162 and/or the surrounding areas of contact portion 152 are induction hardened to be able to withstand the continuous and repeated contacts that will be made with outer race 94 during the operation of joint 54. According to various exemplary embodiments, contact surface 162 and/or the surrounding areas of contact portion 152 are induction-hardened to between approximately 30 and approximately 60 Rockwell C, such as approximately 50 Rockwell C. The hardening of only certain portions of limiter ring 102 allows those portions of limiter ring 102 that will be subjected to repeated contact with outer race 94 to be able to withstand such contact, and at the same time, allows the remaining portions of limiter ring 102 to be workable, such as when a portion of limiter ring 102 is crimped in groove 132. According to various alternative and exemplary embodiments, the contact surface and/or the surrounding areas of the contact surface may not be hardened, they may be hardened using methods or techniques other than induction hardening, and/or they may be hardened to varying degrees of hardness depending on, among other potential factors, the particular application in which joint 54 will be used and the materials selected for the various components of joint 54.

According to various exemplary and alternative embodiments, the point at which the limiter ring is configured to contact the outer race may occur when the angle between axis 123 and axis 117 is between approximately 0° and approximately 3°. According to one exemplary embodiment, limiter ring 102 is configured to contact outer race 94 when pin 98 is pivoted or rotated to the point where the angle between axis 123 and axis 117 is approximately 3°. According to various exemplary and alternative embodiments, the limiter ring may be configured to contact the inner race when the angle between axis 123 and axis 117 greater or less than 3°. According to other alternative and exemplary embodiments, the limiter ring may be configured to contact a portion of the cylinder or both the outer race and a portion of the cylinder.

According to various alternative embodiments, the limiter rings may be individual pieces that are formed separately from the pin and/or the inner race, or the limiter rings may be integrally-formed as a single unitary body with the pin and/or the inner race. According to various other alternative and exemplary embodiments, the limiter rings may take one of a variety of different shapes, sizes, and configurations.

As best shown in FIGS. 3-5, seals 104 and 106 (e.g., face seals, disks, washers, rings, gaskets, caps, etc.) are generally cup-shaped, resilient members that are configured to generally seal in any grease that may be present in joint 54 and to protect joint 54 from the entry of any debris into joint 54. Seals 104 and 106 are generally identical except that they are oriented in generally opposite directions when incorporated into joint 54. Accordingly, only seal 106 will be described, it being understood that seal 104 is substantially the same. According to one exemplary embodiment, seal 106 includes a substantially rigid portion 163 (see FIG. 5), a base portion 164, and periphery portion 166.

Rigid portion 163 (e.g., hub, support, backbone, reinforcing member, etc.) is a generally rigid member that forms the inside diameter of seal 106 and that is intended to provide a structure to seal 106 that facilitates coupling seal 106 to limiter ring 102. Rigid portion 163 is configured to enable seal 106 to be press fit onto limiter ring 102. According to various alternative and exemplary embodiments, the rigid portion may be one or more of a variety of different materials, including various metals, steel, polymers, plastics, elastomers, ceramics, or other suitable materials. According to various alternative and exemplary embodiments, the rigid portion of the seal may be configured to couple to the limiter ring, the pin, and/or other portions of the joint and may do so in a variety of different manners (e.g., friction fit, snap rings, adhesives, a threaded interface, crimping, the rigid portion may fit within a groove or recess provided around the outer periphery of the limiter ring, etc.) and at a variety of different locations on the limiter ring, the pin, and/or other parts of the joint. According to another alternative embodiment, the rigid portion may not be included in the seal, and the base portion of the seal may be configured to directly couple to the limiter ring, the pin, and/or other parts of the joint.

Base portion 164 (e.g., hub, center, etc.) is a generally circular ring that substantially surrounds rigid portion 163 and that is configured to couple to rigid portion 163. When coupled to limiter ring 102, the portion of base portion 164 that faces inner race 96 generally rests against contact portion 152 of limiter ring 102. According to various alternative and exemplary embodiments, the base portion may be configured to be coupled directly to the outer surface of the limiter ring, the pin, and/or other parts of the joint in a variety of different ways (e.g., friction fit, snap rings, press fit, adhesives, a threaded interface, crimping, the base portion may fit within a groove or recess provided around the outer periphery of the limiter ring, etc.) and at a variety of different locations on the limiter ring, the pin, and/or other parts of the joint. According to other various alternative and exemplary embodiments, the base portion may take a variety of different shapes, sizes, and configurations.

Periphery portion 166 (e.g., disk, gasket, washer, etc.) is a resilient portion of seal 106 that generally extends radially outward from base portion 164 of seal 106, as well as inwardly toward cylinder 50, to form a substantially concave member that contacts a portion of cylinder 50. The extension of periphery portion 166 between base portion 164 and a portion of cylinder 50 is intended to form a seal that hampers the ability of debris to pass between cylinder 50 and limiter ring 102 and enter joint 54, and the ability of grease or other lubricants to pass between cylinder 50 and limiter ring 102 and escape from joint 54. It also should be noted that the manner in which limiter ring 102 is coupled to pin 98 (e.g., a press fit that may be supplemented by a type of adhesive or sealer) is generally sufficient to hamper the ability of any debris or grease to pass between limiter ring 102 and pin 98. Periphery portion 166 is configured to deform, bend, and/or flex in conjunction with the movement of pin 98 so that the entire circumference of periphery portion 166 maintains contact with a portion of cylinder 50, regardless of the position of pin 98 (as long as pin 98 is within the range of motion that is limited by limiter rings 100 and 102). According to one exemplary embodiment, periphery portion 166 includes a base end 170 and a distal end 172. Base end 170 forms the end of periphery portion 166 that is proximate base portion 164. Distal end 172 forms the end of periphery portion 166 that is spaced apart from base portion 164 and that generally contacts surface 84 of cylindrical portion 66 of rod end 64 of cylinder 50. The thickness of periphery portion 166 generally decreases from base end 170 to distal end 172, to allow distal end 172 to deform, bend, and/or flex to a greater extent than base end 170. To further facilitate the deflection of periphery portion 166, seal 106 includes a notch 174 that extends into seal 106 proximate base end 170 of periphery portion 166. Notch 174 has the effect of reducing the thickness of seal 106 in an area proximate base end 170 of periphery portion 166, which is intended to allow periphery portion 166 to deform and deflect to the extent necessary to continuously maintain contact between distal end 172 of periphery portion 166 and surface 84 of cylinder 50. In order to provide a suitable surface against which seal 106 can form an effective seal, surface 84 (as well as surface 78) has a relatively smooth surface finish. According to one exemplary embodiment, surface 84 (and surface 78) has a surface finish of approximately 63 microinches or finer. According to other exemplary and alternative embodiments, the surfaces against which the seals contact may have one of a variety of different surface finishes.

According to one exemplary embodiment, the seal is polyurethane. According to various other exemplary and alternative embodiments, the seal may be one or more of a variety of different materials, including various elastomers, polymers, rubbers, and another suitable materials.

According to various exemplary and alternative embodiments, the seal may take one of a variety of different shapes, sizes, and configurations depending on the particular circumstances in which the seal is used. For example, the seal may be configured to be coupled to the pin or to both the pin and the limiter ring, rather than just the limiter ring. The seal may also include various projections, extensions, recesses, grooves, fingers, etc. that facilitate the coupling of the seal to the limiter ring and/or the pin.

Figure 7:
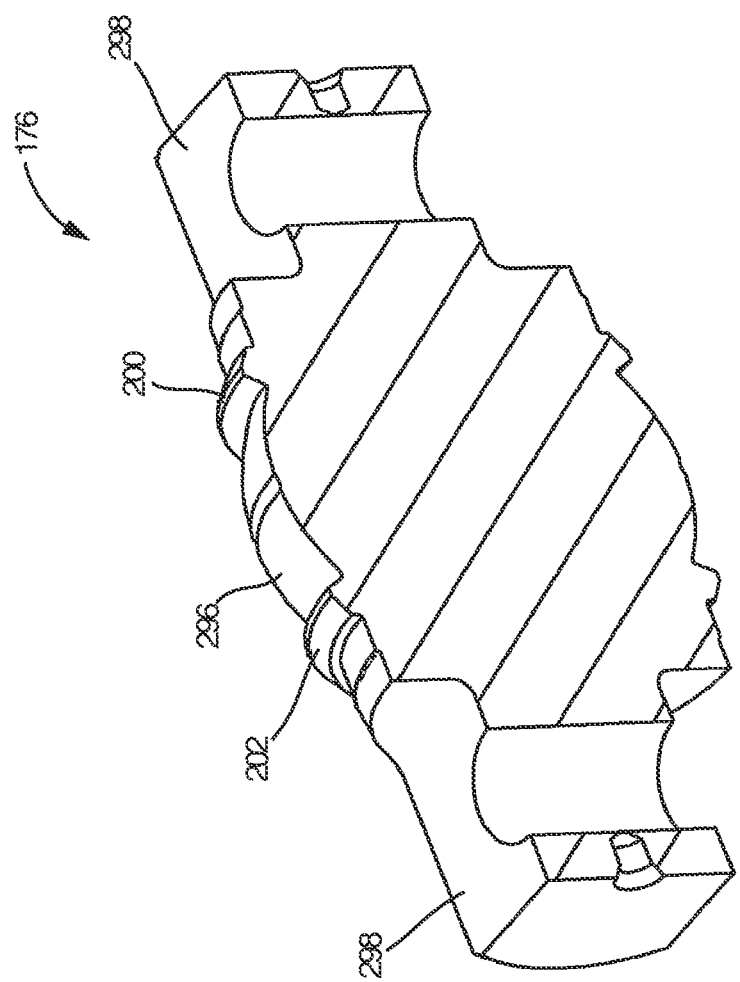
FIG. 7 is a perspective view of an integrated pin of a joint according to an exemplary embodiment.

According to an exemplarily embodiment illustrated in FIG. 7, the pin, the limiter rings, and the inner race may also be integrally-formed as a single unitary body represented by integrated pin 176. Integrated pin 176 includes a pin portion 298, limiter ring portions 200 and 202, and an inner race portion 296, which resemble pin 98, limiter rings 100 and 102, and inner race 96 described above. Generally, integrated pin 176 functions in the same way that pin 98, limiter rings 100 and 102, and inner race 96 function when coupled together into a single assembly, so a detailed explanation of the various features of integrated pin 176 is not needed. Accordingly, the discussion relating to the operation, functionality, and interaction of the various components of the separate component pin assembly generally applies equally to integrated pin assembly 176. Because integrated pin 176 is manufactured as a single unit, no assembly time is needed to construct integrated pin 176. Integrated pin 176 also eliminates the need for crimping and/or press fitting limiter rings onto a pin and generally reduces the likelihood that the limiter rings and/or the inner race may fall off the pin. The single unit construction of integrated pin 176 also may allow the unit to be made smaller and more compact. According to various exemplary and alternative embodiments, various combinations of the pin, the limiter rings, and the inner race may be integrally-formed as a single unitary body. For example, the pin and the inner race may be integrally formed as a single unitary body, with one or more of the limiter rings being manufactured separately and coupled to the pin/inner race units. Moreover, the pin may be integrally formed as a single unitary body with one limiter ring, with the inner race and the other limiter ring being manufactured separately and coupled to the pin/limiter ring unit.

To assemble joint 54, outer race 94 is coupled around inner race 96 and inner race 96 is press fitted onto pin 98. Limiter rings 100 and 102 are press fitted onto each side of pin 98 so that inner end 158 of limiter ring 102 and the corresponding inner end of limiter ring 100 are generally proximate end 120 and end 118 of inner race 96, respectively. In this position, limiter rings 102 and 100 will be generally aligned with grooves 132 and 134 in pin 98, respectively. Once limiter rings 102 and 100 have been press fitted onto pin 98, limiter rings 102 and 100 are crimped into groove 132 and 134 to retain limiter rings 102 and 100 in their respective positions on pin 98. Once outer race 94, inner race 96, pin 98, and limiter rings 100 and 102 have been assembled, the assembly is inserted into aperture 68 of rod end 64 of cylinder 50. The assembly is inserted or press fit into aperture 68 until end 112 of outer race 94 contacts ledge 88 of flange 86. Snap ring 92 is then inserted into groove 90 proximate end 110 of outer race 94 to help retain outer race 94 within aperture 68. Seals 104 and 106 are then coupled (e.g., press fitted) to limiter rings 100 and 102, respectively.

According to various alternative and exemplary embodiments, the order in which the various components of the joint are assembled may vary. For example, if the outer race is a split race, it may be coupled to the inner race after the inner race has already been coupled to the pin and the limiter rings. Moreover, the outer race may be coupled to the inner race after the pin and one limiter ring have been coupled to the inner race. Furthermore, the outer race may be coupled to the inner race before the inner race is coupled to the pin, after the inner race is coupled to the pin, or after the limiter rings have been coupled to the pin. In addition, the pin may be coupled to the inner race before either limiter rings has been coupled to the pin or after one of the limiter rings has been coupled to the pin. According to other various exemplary and alternative embodiments, the various components may be press fit onto or into one another, or the components may be coupled using one or more other techniques or methods, such as welding, adhesives, snap rings, crimping, fasteners, or one or more of a variety of other techniques or methods.

In operation, limiter rings 100 and 102 (or the corresponding structures of integrated pin 176) limit the extent to which pin 98 (axis 123) is able to pivot or rotate relative to axis 117. This limits the extent to which pin 98 may approach or move away from surfaces 78 and 84 of cylinder 50, which in turn, limits the range of rotation or motion that seals 104 and 106 should be able to accommodate before the integrity of the seal is compromised. According to one exemplary embodiment, seals 104 and 106 are configured to accommodate rotation of pin 98 (axis 123) up to approximately 3° from axis 117. To help ensure that seals 104 and 106 maintain the appropriate seal around the entire periphery of each seal, limiter rings 100 and 102 are configured to contact outer race 94 when pin 98 (axis 123) rotates approximately 3° from axis 117. According to various other exemplary and alternative embodiments, the seals may be configured to accommodate rotation of the pin to the point where axis 123 is greater or less than 3° from axis 117, and the limiter rings may be configured to contact the outer race before the pin rotates beyond the capability of the seals.

According to one exemplary embodiment, limiting the rotation of pin 98 (axis 123) to no more than 3° from axis 117 is sufficient to allow suspension system 10 to operate properly, and at the same time limits any rotation that is unnecessary to the operation of suspension system 10. For example, in suspension system 10, lower control arm 14 generally pivots upward and downward about an axis in response to the movement of wheel assembly 20. Because one end of cylinder 50 is coupled to frame member 12, which is stationary, and the other end of cylinder 50 is coupled to a portion of lower control arm 14 that generally moves in a arc-shaped path around the pivot axis of lower control arm 14, cylinder 50 tends to pivot or articulate relative to lower control arm 14. Although this rotation generally takes place around axis 123, the manufacturing and assembly tolerances of the various components of suspension system 10 may require pin 98 to be rotated to a position where axis 123 does not correspond with axis 117. Depending on the particular application, these manufacturing and assembly tolerances may require that pin 98 (axis 123) be rotated as much as 2° or more from axis 123. In addition to the sources of rotation described above that joint 54 should be able to accommodate, there are other sources of rotation that joint 54 may be subjected to that are not necessary for the operation of suspension system 10. For example, the contraction and expansion of cylinder 50 as suspension system 10 operates tends to cause piston rod 58 to rotate within cylinder tube 56 generally around axis 119. If left unchecked, this could cause pin 98 (axis 123) to rotate relative to axis 117 more than the 3° that seals 104 and 106 are generally configured to withstand. Limiter rings 100 and 102 restrain this unnecessary rotation to a magnitude that will not compromise the integrity of seals 104 and 106. Accordingly, at least with respect to one exemplary embodiment of suspension system 10, limiting the rotation of pin 98 (axis 123) from axis 117 to no more than 3° does not affect the operation of suspension system 10 and helps to reduce the likelihood that a portion of seal 104 or 106 will pull away from the sealing surface on cylinder 50 and compromise the integrity of the seal. According to various other exemplary and alternative embodiments, the rotation of pin 98 (axis 123) relative to axis 117 may be limited to other magnitudes greater or less than 3°, and the seals may be configured to withstand corresponding magnitudes of rotation, depending on the particular situation.

When joint 54 is in the neutral or equilibrium position generally illustrated in FIG. 3, axis 123 of pin 98 is aligned with axis 117 of outer race 94. In this condition, seal 106 is in a preloaded condition in which a generally uniform force is applied by seal 106 to surface 84 around its entire periphery. As a result of the uniform preload, periphery portion 166 is generally forced back or deformed toward base portion 164 against the bias resulting from the resilient nature of seal 106. The preload of seal 106 is intended to allow seal 106 to maintain contact with surface 84 even if it, or a portion of it, is moved away from surface 84, which is what occurs when pin 98 is rotated around an axis other than axis 123. When pin 98 is rotated around an axis (other than axis 123) by an angle θ (e.g., the point at which limiter ring 102 contacts outer race 94) as illustrated in FIG. 4, the relative deformation or retraction of seal 106 varies around its periphery. For example, the part of periphery portion 166 of seal 106 that is proximate the location where limiter ring 102 contacts outer race 94 will be deflected outwardly (away from cylinder 50 and against the bias of seal 106) to its maximum deflected position. This is generally because at this location, the portion of limiter ring 102 making contact with outer race 94 will be as close to surface 84 of cylinder 50 as it will get. The close proximity of limiter ring 102 (and therefore base portion 164 of seal 106) to surface 84 forces periphery portion 166 to deform or flex outwardly into a less concave configuration. Periphery portion 166 on the opposite side of seal 106, on the other hand, will be retracted inwardly (toward cylinder 50) to its maximum retracted position. This is generally because at this location, the portion of limiter ring 102 that is opposite the portion making contact with outer race 94 will be as far away from surface 84 of cylinder 50 as it will get. The distance between limiter ring 102 (and therefore base portion 164 of seal 106) and surface 84 in combination with the resilient nature of periphery portion 166 allows periphery portion 166 to retract inwardly into a more concave configuration. Stated differently, the bias of seal 106 to return to its unloaded, concave state that results from the resilient nature of periphery portion 166 allows seal 106 to maintain contact with surface 84 even though limiter ring 102 is moved away from outer race 94. The parts of periphery portion 166 of seal 106 located between the two extreme positions gradually transition from one extreme to the other. It should be noted that the relative deformation or retraction of seal 104 is generally the same as for seal 106, except that it is opposite that of 106. Thus, at locations where seal 106 is in the fully deflected position, seal 104 will be in the fully retracted position, and so on.

If the extent to which pin 98 could be rotated was not limited by limiter rings 100 and 102 (or some other appropriate structure), pin 98 could be rotated during the operation of suspension system 10 beyond a certain threshold point after which it would be difficult for seal 106 to maintain contact with surface 84 around its entire periphery and therefore maintain a sufficient seal around its entire periphery. Once the integrity of the seal is compromised, debris is able to pass beyond seal 106 and contaminate joint 54, which causes it to wear faster. Moreover, lubricants, such as grease, within joint 54 are allowed to escape through the seal potentially leaving joint 54 under-lubricated. Although limiting the extent to which pin 98 (axis 123) may be rotated relative to axis 117 helps to ensure that a sufficient seal is maintained, there is generally no need to limit the rotation of pin 98 around axis 123 because such rotation will not subject seal 106 to any further deformation that would cause a portion of it to lift off or break contact with surface 84.

According to various exemplary and alternative embodiments, the joint or bearing described above may be used in a wide variety of contexts and situations. For example, the joint may be used in the suspension systems of heavy-duty vehicles, such as dump trucks, cement trucks, garbage trucks, etc., or it may be used in the suspension systems of lighter duty vehicles such a common passenger vehicles, golf carts, or ATVs. Moreover, the joint may be used in systems other than suspension systems. For example, it may be used in any system that requires the coupling together of two members that will rotate or pivot relative to one another. Moreover, it may be used in systems that operate in an unclean or dirty environment, such as systems on earth moving vehicles like excavators or backhoes. It may also be used in a wide variety of other systems and situations.

Although the present inventions have been described with reference to exemplary and alternative embodiments, workers skilled in the art will recognize that changes may be made in form and detail without departing from the spirit and scope of the invention. For example, although different exemplary and alternative embodiments may have been described as including one or more features providing one or more benefits, it is contemplated that the described features may be interchanged with one another or alternatively be combined with one another in the described exemplary embodiments or in other alternative embodiments. Because the technology of the present invention is relatively complex, not all changes in the technology are foreseeable. The present invention described with reference to the exemplary and alternative embodiments and set forth in the following claims is manifestly intended to be as broad as possible. For example, unless specifically otherwise noted, the claims reciting a single particular element also encompass a plurality of such particular elements.

What is claimed is:

1. A joint for use in a suspension system including an elongated suspension member, the joint comprising:
    an outer race configured to be coupled to a cylinder of the elongated suspension member, wherein the outer race includes a contact portion;
    an inner race coupled to the outer race and moveable relative to the outer race;
    a shaft coupled to the inner race;
    a first collar including a coupling portion fixed to the shaft, a ring portion extending toward the inner race from the coupling portion, and an interfacing portion having a base extending radially outward from a centerline of the shaft and a limiting protrusion extending toward the outer race from the base and defining an angled contact surface, the angled contact surface interfacing with the contact portion of the outer race to limit the movement of at least one of the inner race and the shaft relative to the outer race, wherein the first collar and the shaft comprise separate components press fit together; and
    a seal member including a base portion fixed to the first collar to prevent sliding there between and an elongated portion extending radially outward and toward the outer race from the base portion and defining a periphery surface, wherein the periphery surface is slidably coupled to a portion of the cylinder of the elongated suspension member to form a seal;
    wherein the first collar limits the movement of the at least one of the shaft and the inner race to a range of motion that is offset relative to a longitudinal axis of the outer race so that the seal member maintains the seal between the one of the shaft and the first collar and the portion of the cylinder of the elongated suspension member.

2. The joint of claim 1, wherein the first collar is coupled to the shaft proximate a first side of the inner race.

3. The joint of claim 2, further comprising a second collar coupled to the shaft and limiting the movement of at least one of the inner race and the shaft relative to the outer race.

4. The joint of claim 3, wherein the second collar is coupled to the shaft proximate a second side of the inner race.

5. The joint of claim 3, wherein the second collar is crimped to the shaft.

6. The joint of claim 1, wherein the first collar is crimped to the shaft.

7. The joint of claim 1, wherein the shaft is fixedly coupled to the inner race.

8. The joint of claim 1, wherein the shaft includes a longitudinal axis about which the shaft is rotatable.

9. The joint of claim 8, wherein the inner race is rotatable around a single point.

10. The joint of claim 9, wherein the longitudinal axis of the outer race and the longitudinal axis of the shaft extend through the point about which the inner race is rotatable.

11. The joint of claim 10, wherein the first collar contacts the outer race when the shaft is rotated relative to the longitudinal axis of the outer race to a maximum position.

12. The joint of claim 11, wherein the contact between the first collar and the outer race limits the rotation of the shaft relative to the longitudinal axis of the outer race.

13. The joint of claim 12, wherein the angled contact surface contacts the contact portion of the outer race when the shaft is rotated relative to the longitudinal axis of the outer race to the maximum position.

14. The joint of claim 13, wherein the angled contact surface is hardened.

15. The joint of claim 12, wherein the contact between the first collar and the outer race limits the rotation of the shaft relative to the longitudinal axis of the outer race to no more than about three degrees.

\* \* \* \* \*